United States Patent
Vangala et al.

(10) Patent No.: US 10,433,213 B2
(45) Date of Patent: Oct. 1, 2019

(54) APPARATUS, SYSTEMS AND METHODS FOR AN ADAPTIVE SEGMENT SIZE FOR DATA TRANSMISSIONS

(71) Applicant: APPLE INC., Cupertino, CA (US)

(72) Inventors: Sarma Vangala, Campbell, CA (US); Srinivas Pasupuleti, San Jose, CA (US); Padma Bhooma, Los Gatos, CA (US); Christoph Paasch, Cupertino, CA (US); Cahya A Masputra, San Jose, CA (US); Rafael Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 15/178,309

(22) Filed: Jun. 9, 2016

(65) Prior Publication Data
US 2017/0359756 A1 Dec. 14, 2017

(51) Int. Cl.
*H04W 28/18* (2009.01)
*H04L 29/06* (2006.01)
*H04W 24/02* (2009.01)
*H04L 12/805* (2013.01)
*H04L 12/26* (2006.01)

(52) U.S. Cl.
CPC ............ *H04W 28/18* (2013.01); *H04L 47/36* (2013.01); *H04L 69/16* (2013.01); *H04L 69/166* (2013.01); *H04W 24/02* (2013.01); *H04L 43/0852* (2013.01)

(58) Field of Classification Search
CPC ........ H04W 28/18; H04W 24/02; H04L 69/16
See application file for complete search history.

(56) References Cited

U.S. PATENT DOCUMENTS

| | | | |
|---|---|---|---|
| 8,537,710 B2 | 9/2013 | Ner et al. | |
| 8,885,476 B2 | 11/2014 | Kakadia et al. | |
| 9,088,965 B2 | 7/2015 | Cheng | |
| 9,131,390 B2 | 9/2015 | Kakadia et al. | |
| 2006/0245452 A1* | 11/2006 | Frederiksen | H04L 1/0007 370/470 |
| 2007/0266233 A1* | 11/2007 | Jethanandani | H04L 63/166 713/153 |
| 2012/0281559 A1* | 11/2012 | Ner | H04W 28/06 370/252 |
| 2014/0198643 A1* | 7/2014 | Conway | H04W 24/08 370/230 |

(Continued)

FOREIGN PATENT DOCUMENTS

EP 2829147 1/2015
JP 2008-252311 10/2008
(Continued)

*Primary Examiner* — Kyaw Z Soe
(74) *Attorney, Agent, or Firm* — Fay Kaplun & Marcin, LLP (57) ABSTRACT

Described herein are apparatus, systems and methods for adaptive segment size for data transmissions. A method may comprise, at a user equipment ("UE"), identifying a current size setting of a data segment (e.g., a transmission control protocol ("TCP") maximum segment size ("MSS")) for communication over a network, receiving current physical layer conditions, receiving historical data, and adjusting the current size setting based on at least one of the current physical layer conditions and the historical data.

16 Claims, 7 Drawing Sheets

(56) References Cited

U.S. PATENT DOCUMENTS

| | | | |
|---|---|---|---|
| 2015/0036511 A1* | 2/2015 | Cheng | H04W 28/04 370/242 |
| 2015/0038134 A1* | 2/2015 | Cheng | H04W 24/08 455/426.1 |
| 2015/0106530 A1 | 4/2015 | Alanen et al. | |
| 2015/0365503 A1* | 12/2015 | Sung | H04L 69/16 370/252 |
| 2016/0073428 A1* | 3/2016 | Vutukuri | H04W 72/1215 370/329 |
| 2016/0142934 A1* | 5/2016 | Ahmadzadeh | H04W 28/0278 370/328 |

FOREIGN PATENT DOCUMENTS

| | | |
|---|---|---|
| WO | 2013/142524 | 9/2013 |
| WO | 2015/078492 | 6/2015 |

\* cited by examiner

Fig. 1

Graph 100

Table 500

| Throughput (kbps) | eLQM = 20 poor | | |
|---|---|---|---|
| | Adaptive MSS | No Adaptive MSS | % Difference |
| Round 1 | 118 | 103 | 14.56% |
| Round 2 | 136 | 135 | 0.74% |
| Round 3 | 171 | 145 | 17.93% |

| Throughput (kbps) | eLQM = 50 good | | |
|---|---|---|---|
| | Adaptive MSS | No Adaptive MSS | % Difference |
| Round 1 | 3798 | 3816 | -0.47% |
| Round 2 | 3778 | 3847 | -1.79% |
| Round 3 | 3769 | 3814 | -1.18% |

| Throughput (kbps) | eLQM = 50 poor | | |
|---|---|---|---|
| | Adaptive MSS | No Adaptive MSS | % Difference |
| Round 1 | 3729 | 3754 | -0.67% |
| Round 2 | 3760 | 3750 | 0.27% |
| Round 3 | 3755 | 3734 | 0.56% |

APPARATUS, SYSTEMS AND METHODS FOR AN ADAPTIVE SEGMENT SIZE FOR DATA TRANSMISSIONS

BACKGROUND

Within communication networking, Transmission Control Protocol ("TCP") is a standard that defines the manner in which a network conversation is established and maintained to allow application programs to exchange data. TCP works in conjunction with the Internet Protocol ("IP"), which defines the manner in which computer devices transmit packets of data to each other. Accordingly, the TCP and IP protocols define the basic rules defining the Internet. More specifically, TCP provides reliable, structured, and error-checked delivery of a stream of data between applications running on hosts communicating over an IP network. Important Internet applications, such as web browsers, email, remote administration and file transfer rely on TCP communications.

TCP provides a communication service at an intermediate level between an application program and the Internet Protocol by providing host-to-host connectivity at the transport layer of the Internet mode. TCP may be described as a connection-oriented protocol, such that a connection is established and maintained until the application programs at each end have finished exchanging messages. TCP determines the manner in which application data is broken down into packets, such that networks can transmit packets to and accepts packets from the network layer. TCP also manages flow control and handles re-transmission of dropped packets, as well as acknowledgement of all packets, to reduce data transmission errors.

As noted above, TCP accepts data from a data stream, divides it into smaller portions and adds a TCP header, thereby creating a TCP segment. The TCP segment is then encapsulated into an IP datagram and exchanged with peers. The maximum segment size ("MSS") is the largest amount of data, as specified in bytes, that TCP is to receive in a single segment. The TCP MSS selection is typically performed during a handshake operation, wherein the MSS is announced by each side using the MSS option when the TCP connection is established. The TCP MSS may be derived from the maximum transmission unit ("MTU") size of the data link layer of the networks to which the sender and receiver are directly attached.

In the current implementations of TCP, the TCP MSS values are set without regard to power and bandwidth constraints. This can yield potentially devastating results when applied to link-budget limited devices and/or power limited devices.

SUMMARY

Described herein are apparatus, systems and methods for adaptive segment size for data transmissions. A method may comprise, at a user equipment ("UE"), identifying a current size setting of a data segment (e.g., a transmission control protocol ("TCP") maximum segment size ("MSS")) for communication over a network, receiving current physical layer conditions, receiving historical data, and adjusting the current size setting based on at least one of the current physical layer conditions and the historical data.

Also described herein is a user equipment ("UE") device comprising a non-transitory memory having a program stored thereon, and a processor. Furthermore, execution of the program causes the processor to perform operations comprising identifying a current size setting of a data segment (e.g., a TCP MSS) for communicating over a network, receiving current physical layer conditions, receiving historical data, and adjusting the current size setting based on at least one of the current physical layer conditions and the historical data.

Also described herein is an integrated circuit, comprising circuitry to identify a current size setting of a data segment for communication over a network, wherein the circuitry further receives current physical layer conditions and historical data, and wherein the circuitry further adjusts the current size setting based on at least one of the current physical layer conditions and the historical data.

DETAILED DESCRIPTION

The exemplary embodiments may be further understood with reference to the following description and the appended drawings, wherein like elements are referred to with the same reference numerals. The exemplary embodiments describe an apparatus, systems and methods for adaptive segment size for data transmissions. It should be noted that while the exemplary embodiments described herein refer to adjusting a current transmission control protocol ("TCP") maximum segment size ("MSS") setting in a wireless network, such as a cellular network, any type of communication network may be used and the systems and methods are not limited to adjusting TCP MSS settings over a cellular network.

Those skilled in the art will understand that the current methodology for TCP MSS selection is typically performed during a handshake operation. For example, when a Web server sends an HTML file to a client, it uses the HTTP protocol to do so. The HTTP program layer asks the TCP layer to set up the connection and send the file. The TCP stack divides the file into packets, numbers the packets and then forwards the packets individually to the IP layer for delivery. Although each packet in the transmission will have the same source and destination IP addresses, packets may be sent along multiple routes. The TCP program layer in the client computer (e.g., the receiving device) waits until all of the packets have arrived, then acknowledges the packets received and requests retransmission on any packets that are not received (e.g., based on missing packet numbers), then assembles the packets into a file and delivers the file to the receiving application.

Within wireless networking, the handshake may be between a base station ("BS") and a user equipment ("UE"). For instance, to establish a connection, each of these devices may send feedback in the form of a "SYN" (synchronize message) to the other device, and receive an "ACK" (acknowledgment message) from the other device. Accordingly, there are may be four control messages passed between the devices during a feedback loop. However, it is inefficient to send a SYN and an ACK in separate messages when one message could communicate both simultaneously. Thus, in the normal sequence of events in connection establishment, one of the SYNs and one of the ACKs may be sent together by setting both of the relevant bits in an SYN+ACK message. This makes a total of three messages, and the connection procedure may be referred to as a three-way handshake.

Furthermore, one skilled in the art would understand that the length of time it takes for a signal to be sent as well as the length of time it takes for an acknowledgment of that signal to be received may be referred to as roundtrip time ("RTT") or roundtrip delay. A shorter RTT is beneficial as it ensures a quicker response time to any changes in the network and a faster adaptation by the sender to combat these changes.

As noted above, TCP handles all handshaking and transmission details at the transport layer and presents an abstraction of the network connection to the application program. The maximum segment size ("MSS") may refer to the largest amount of data, as specified in bytes, that TCP is willing to receive in a single TCP segment. For instance, a TCP segment in a typical TCP may be on the scale of 1400-1500bytes. The MSS may be set small enough to avoid IP fragmentation that can lead to packet loss and excessive retransmissions. The TCP MSS may be announced by each side during the handshake when a TCP connection is established. Specifically, the TCP MSS may be derived from the maximum transmission unit ("MTU") size of the data link layer of the networks to which the sender device and receiver device are directly attached.

Depending on the type of device and its capabilities, this approach results in limitations to the end users, as well as the network operators. For instance, TCP MSS values are typically selected and used in settings where power and bandwidth are not a constraint on the connected device. However, these typical TCP MSS values may have drastic consequences when applied to link budget limited devices (e.g., such as a wearable computing device).

One skilled in the art would understand that a link budget accounts for of all of the gains and losses from the sending device over a link to a receiving device in a telecommunication system. The link budget may account for the attenuation of the transmitted signal due to propagation, as well as the antenna gains, feedline and miscellaneous losses. Randomly varying channel gains, such as fading, are taken into account by adding some margin depending on the anticipated severity of its effects. Accordingly, a typical link budget equation may calculate a received power value (e.g., in decibels) as transmit power plus gains less losses.

Figure 1:
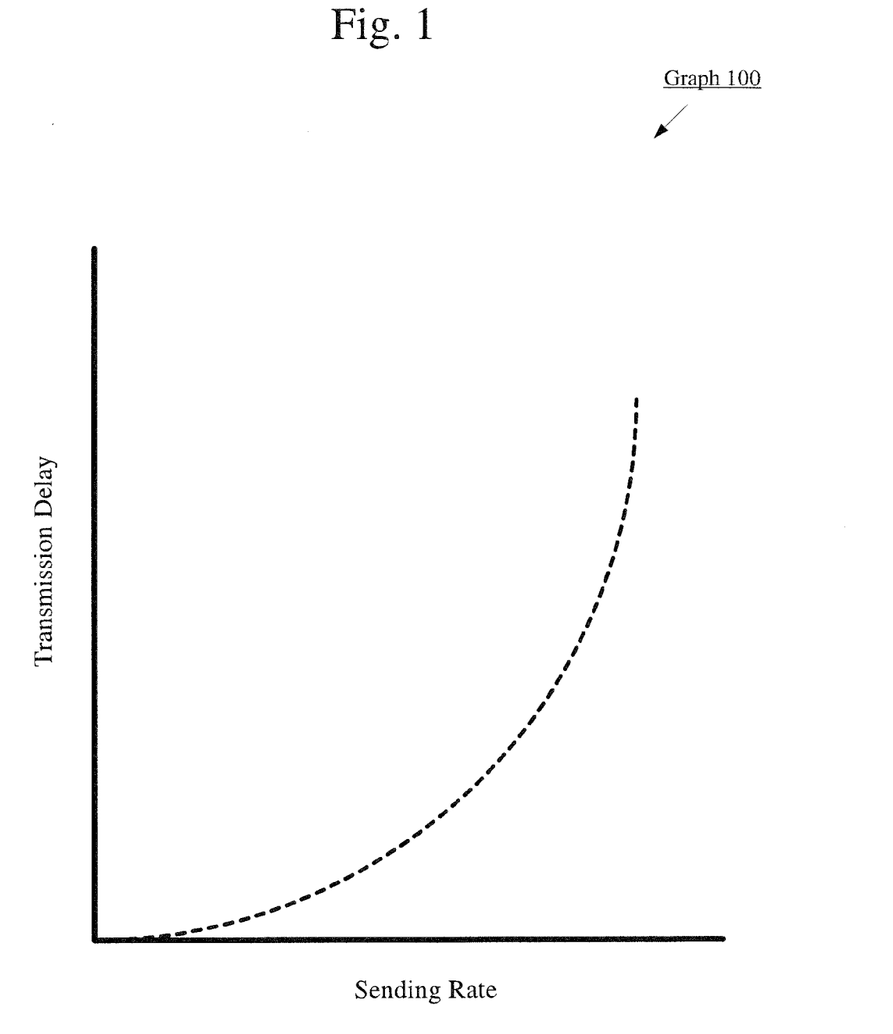
FIG. 1 shows an exemplary graph depicting an exponential curve for delay as a function of increased sending rates.

Link budget limited devices, such as wearable telecommunication devices, may have a lower transmit power due to hardware and/or software limitations (e.g., antenna size, processing capacity, battery size, etc.). Accordingly, the RTT for TCP communications in such devices may follow an exponential curve for delays as a function of increased sending rate, as illustrated in graph 100 of FIG. 1. Such delays may lead to potential TCP timeouts that cause the TCP feedback loop to back off and retry packets. These retransmissions may then lead to situation wherein newer data sits in the device queue on top of older, stale data. Each of the factors results in further degradation of performance by these link budget limited devices.

As will be described in great detail below, exemplary systems and methods may implement an adaptive MSS mechanism based on network observed parameters. The network observed parameters may include, but are not limited to radio frequency ("RF") measurements, grant-based measurements, delay-based measurements, etc. In addition to current physical layer conditions, the adaptive MSS mechanism may also take into consideration historical information pertaining to MSS selection. Accordingly, the TCP stack may utilize these indicators and historical data to dynamically adjust and readjust the MSS settings on a per-flow basis.

Figure 2:
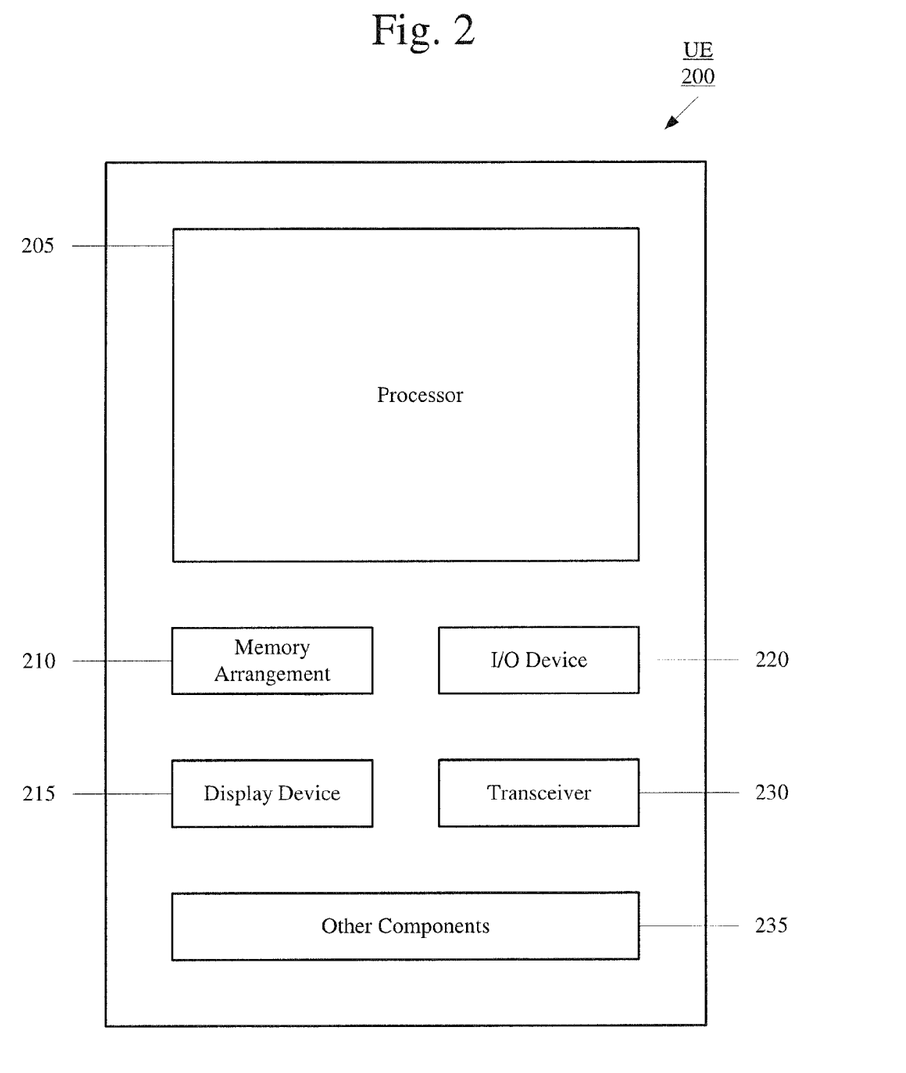
FIG. 2 shows a mobile device, such as the UE, for utilizing adaptive segment size for data transmissions, such as TCP MSS, according to various embodiments described herein.

FIG. 2 shows a mobile device, such as a UE 200, for utilizing adaptive segment size for data transmissions, such as TCP MSS, according to various embodiments described herein. The UE 200 may represent any electronic device that is configured to perform wireless functionalities described herein. Accordingly, the UE 200 may be a portable device such as a smartphone, a tablet, a phablet, a laptop, a wearable, etc. In another example, the UE 200 may be a client stationary device such as a desktop terminal. The UE 200 may be configured to perform wireless communications, such as cellular and/or WiFi functionalities.

The UE 200 may include a processor 205, a memory arrangement 210, a display device 215, an input/output (I/O) device 220, a transceiver 230, and other components 235. The other components 235 may include, for example, an audio input device, an audio output device, a battery, a data acquisition device, ports to electrically connect the UE 200 to other electronic devices, etc. The processor 205 may be configured to execute a plurality of applications of the UE 200.

It should be noted that the above noted applications each being an application (e.g., a program) executed by the processor 205 is only exemplary. The functionality associated with the applications may also be represented as a separate incorporated component of the UE 200 or may be a modular component coupled to the UE 200, e.g., an integrated circuit with or without firmware. In addition, in some UEs, the functionality described for the processor 205 is split among two processors, a baseband processor and an application processor ("AP"). The exemplary embodiments may be implemented in any of these or other configurations of a UE.

The memory 210 may be a hardware component configured to store data related to operations performed by the UE 200. Specifically, the memory 210 may store data related to various applications. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The UE 200 may be configured to communicate directly with one or more networks, such as an LTE network, a legacy radio access network ("RAN"), a WiFi network, etc. One skilled in the art will understand that exemplary legacy RANs may include a circuit switched network, e.g., GSM, UMTS, CDMA, 1xRTT, 1x, etc. With regards to the exemplary embodiments, the UE 200 may establish a connection with the LTE RAN to, among other functionalities, perform data transfers, voice calls and exchange SMS messages with the LTE network.

The transceiver 230 may be a hardware component configured to transmit and/or receive data. That is, the transceiver 230 may enable communication with other electronic devices directly or indirectly through one or more networks based upon an operating frequency of the network. The transceiver 230 may operate on a variety of different frequencies or channels (e.g., set of consecutive frequencies). Thus, one or more antennas (not shown) coupled with the transceiver 230 may enable the transceiver 230 to operate on the LTE frequency band as well as over a WiFi network.

Figure 3:
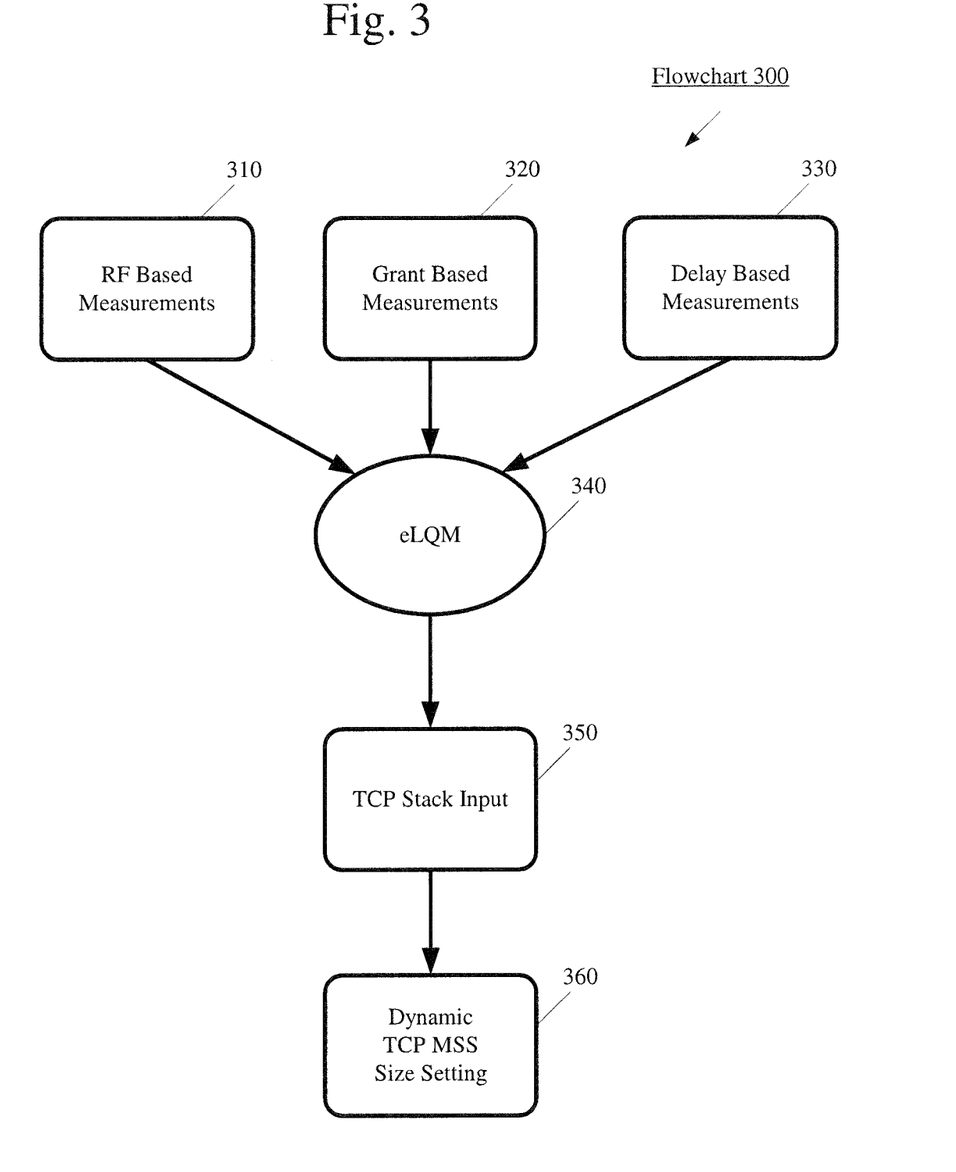
FIG. 3 shows an exemplary flowchart for utilizing adaptive segment size for data transmissions, such as TCP MSS, according to various embodiments described herein.

FIG. 3 shows an exemplary flowchart 300 for utilizing adaptive segment size for data transmissions, such as TCP MSS, according to various embodiments described herein. The exemplary UE 200 of FIG. 2 may perform the actions depicted in the flowchart 300. For instance, the processor 205 and/or other circuitry (e.g., an integrated circuit) within the UE 200 may perform the actions described herein. Alternatively, further components of the network, such as a base station, may also perform these actions, such that the adaptive segment size for data transmissions is set based on date from other components. In other words, the base station may determine that the UE 200 is a link-budget limited device and perform the actions of flowchart 300 to inform the UE 200 of a TOP MSS size setting based on conditions and/or historical data.

As noted above, the exemplary embodiments allow for an adaptive MSS mechanism based on observed and historical network parameters. These parameters may include, but are not limited to, RF-based measurements 310 (e.g., a received signal strength indicator ("RSSI"), a channel quality indicator ("CQI"), etc.), grant-based measurements 320 and delay-based measurements 330.

Accordingly, the various parameters including physical layer conditions and historical information may be sent to a link quality monitoring component ("LQM") 340 (e.g., an enhanced-LQM ("eLQM")). The LQM component 340 provides a standards-based solution to networking issues by exchanging a link quality report ("LQR") describing the number of packets that have been lost during transmission. The LQM component 340 may rely on each peer (e.g., the transmitting device and the receiving device) to maintain a set of counters to track the number of packets and octets that have been transmitted and successfully received. These counters are then periodically transmitted in an LQR packet. While FIG. 3 depicts the use of the LQM component 340, the exemplary embodiments are not limited to such monitoring protocols. Accordingly, any framework may be used to gather physical layer conditions and historical information.

The information (e.g., LQR) from the LQM component 340 may then be transmitted to the TCP stack input 350 for processing. In other words, the TCP stack input 350 may receive the indicators, such as the physical layer conditions and historical information, and make a determination of a dynamic TCP MSS 360 based on these indicators. Specifically, the TCP stack 350 may set and/or adjust the size of the TCP MSS based on the observed and historical parameters. Accordingly, the TCP MSS 360 may allow for dynamic per flow MSS adjustments. These adjustments ensure that data will not cause delay spikes and also ensure that the TCP may operate efficiently within bandwidth constrained environments (e.g., smaller UEs, such as wearable communication devices, etc.).

Figure 4:
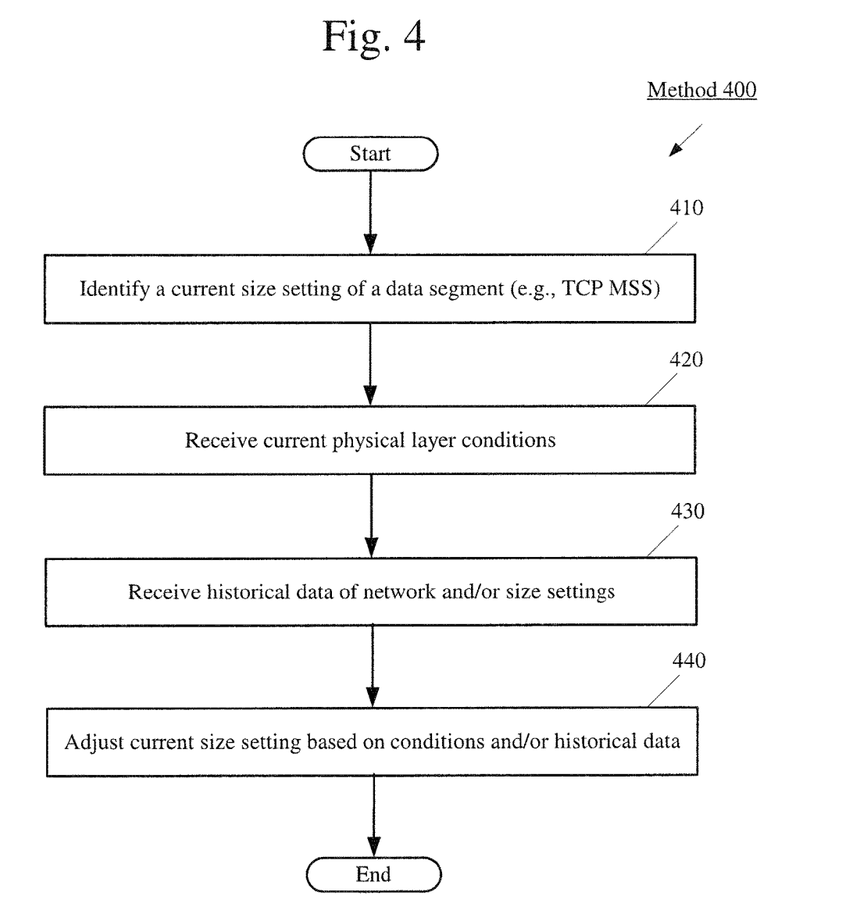
FIG. 4 shows an exemplary method for utilizing adaptive segment size for data transmissions, such as TCP MSS, according to various embodiments described herein.

FIG. 4 shows an exemplary method 400 for utilizing adaptive segment size for data transmissions, such as TCP MSS, according to various embodiments described herein. It should be noted that while the exemplary method 400 is described as being performed by the processor 205, any combination of hardware and software components of the UE 200, such as, but not limited to a baseband processor, an AP, the transceiver 230, etc., may be capable performing the methods described herein.

In 410, the processor 205 may identify a current TCP MSS setting. For instance, a current default TCP MSS setting may be sized at 1400 bytes. However, due to operational limitations of the exemplary UE 200, such a large TCP MSS may lead to packet loss and diminished performance. According to one exemplary embodiment, a large 1400 byte TCP MSS may be considered a maximum setting for the TCP MSS used for favorable or good communication conditions. Additional settings may include other designated smaller sizes, such as 1200 bytes for fair conditions, 500 bytes for poor conditions, etc. Thus, the UE 200 may examine both current physical layer conditions and historical performance information.

In 420, the processor 205 may receive current physical layer conditions of the present communication connection. As noted above, these conditions may include observable measurements such as RSSI, CQI, etc.

In 430, the processor 205 may receive historical TCP MSS data. As noted above, this data may include measurements such as grant-based measurements, delay-based measurements, etc.

In 440, the processor 205 may adjust the current TCP MSS setting based on at least one of the current physical layer conditions and the historical TCP MSS data. For instance, if the processor 205 determines that the physical layer conditions and/or historical information indicate fair communication conditions, the processor 205 may decrease the TCP MSS setting from 1400 bytes to 1200 bytes. Likewise, if the processor 205 determines that the physical layer conditions and/or historical information indicate poor communication conditions, the processor 205 may decrease the TCP MSS setting from 1400 bytes to 500 bytes. It should be noted that while the exemplary method 400 describe three predetermined TCP MSS size settings (e.g., 1400 bytes, 1200 bytes and 500 bytes), one skilled in the art would understand that any number of settings, having any size setting, may be utilized within the exemplary embodiments described herein.

According to one exemplary embodiment, TCP algorithms may start their timers as soon as data is out of the TCP stack, for instance, once the data has been handed over to the next lower layer (e.g., the IP layer). Traditional communications for devices that are not link-budget limited may utilize a typical grant size in medium RF conditions (e.g., RSRP<−110 dBm) of 500 bytes per transmission time interval ("TTI") (e.g., 1 ms). If a link-budget limited device operates within the same conditions, limitations on the device transmit power and eNB power loop algorithms may cause the grant size to drop down to 100 bytes per TTI. Accordingly, this implies that while a TCP packet having a large TCP MSS size setting of 1500 bytes may have previously transmitted out of the device in 3 ms, this large TCP packet may now take 15 ms to transmit from the system (e.g., due to the 100 bytes per TTI transmission rate).

Furthermore, assuming that there are multiple devices in an exemplary cell, the UE 200 may not be given grants to transmit data every ms, but instead is given transmission resources every 10 ms. This implies that the total transmission time of a 1500 byte TCP packet may now be 150 ms on a link-budget limited device, as opposed to 30 ms on a device that is not a link budget limited device (e.g., once again due to the 100 bytes per TTI transmission rate). The subsequent packets that have already been submitted to IP/PDCP layers may incur increasing delays due to the manner in which TCP timers run. Until this packet is actually delivered to the other side and an acknowledgement is received from the receiving node, the TCP timers may continue to run. In conjunction with the increasing delays for the delivery of the packets, the acknowledgements may also experience increasing delays. Thus, these delays may potentially lead to a TCP timeout as well as a reduction in the TCP congestion window due to the TCP activating a congestion control algorithm.

This situation may be further complicated with added packet losses on the cellular link. However, by utilizing the exemplary systems and methods described herein for adaptive MSS (e.g., within a link-budget limited device), the segment size may be reduced, such as to 500 bytes and the transmission delay may be reduced, such as to 50 ms. Accordingly, once this packet is delivered, an acknowledgment may be generated that may allow for the TCP engine to be more stable.

Figure 5:
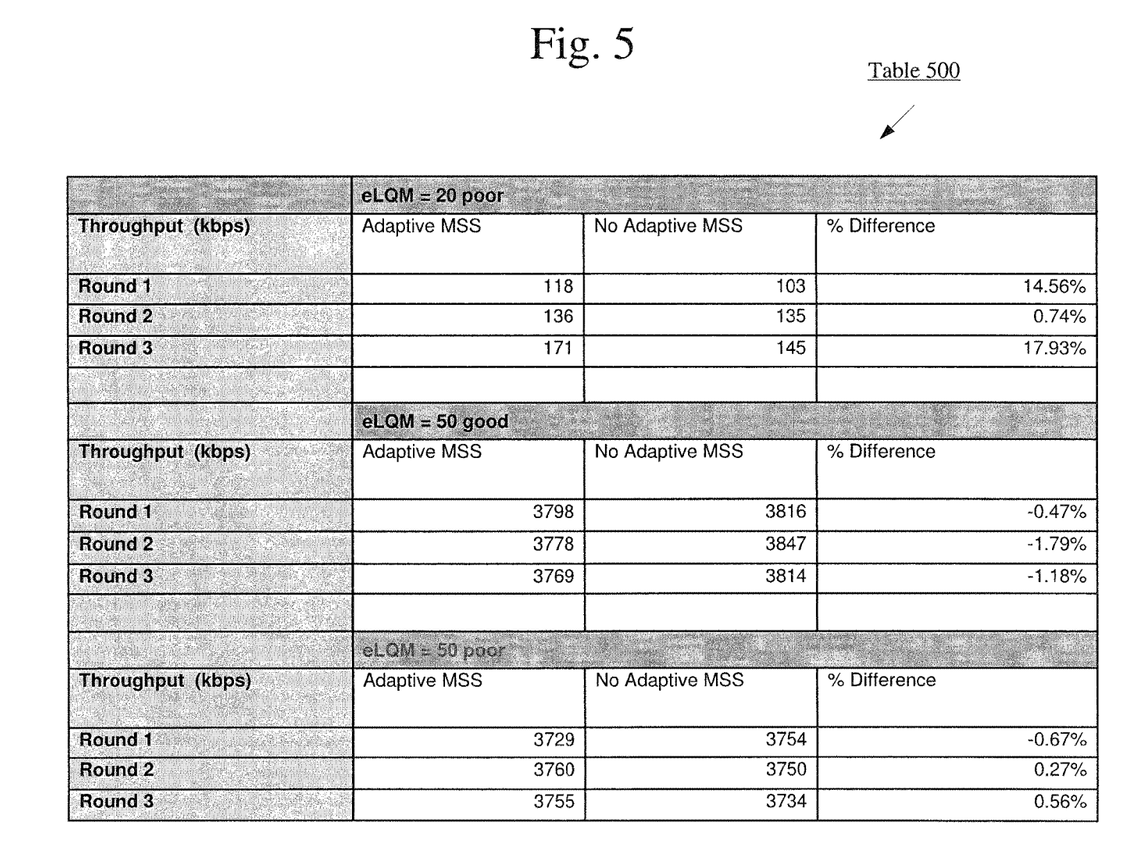
FIG. 5 shows an exemplary table of data depicting gains of an adaptive MSS due to smoothing out of roundtrip time ("RTT"), according to various embodiments described herein.

FIG. 5 shows an exemplary table of data 500 depicting the benefits of an adaptive MSS due to smoothing out of roundtrip time ("RTT"), according to various embodiments described herein. The table 500 illustrates the throughputs (in kbps) during different eLQM conditions (e.g., 20 poor, 50 good, 50 poor). More specifically, the table 500 illustrates the throughputs for each of three rounds while using adaptive MSS, while not using adaptive MSS, and the percentage difference in the throughputs for the two methods.

Figure 6:
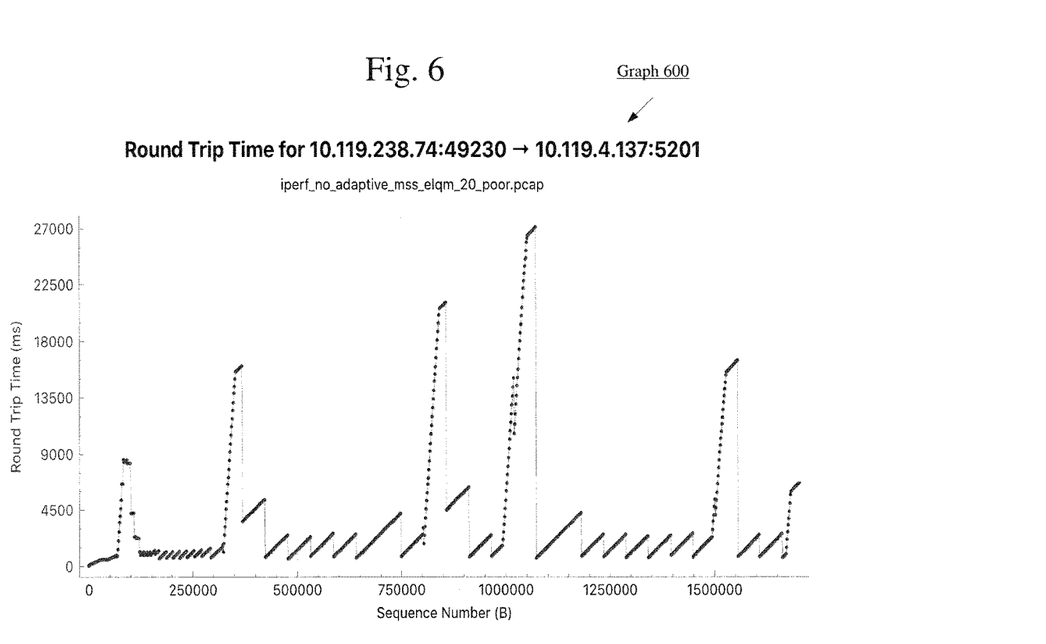
FIG. 6 shows an exemplary graph depicting the TCP RTT for data where the adaptive MSS system is not utilized.

FIG. 6 shows an exemplary graph 600 depicting the TCP RTT for data where the adaptive MSS system is not utilized. As illustrated in graph 600, the TCP RTT may vary very rapidly while reaching very high maximum values. For instance, the RTT reaches peaks of increasingly high values (e.g., 9000 ms, 16000 ms, 20000 ms, and 27000 ms) quickly through data packet sequence numbers 0-1000000. As discussed above, these high TCP RTT may lead to increased delays and a reduction in device performance.

Figure 7:
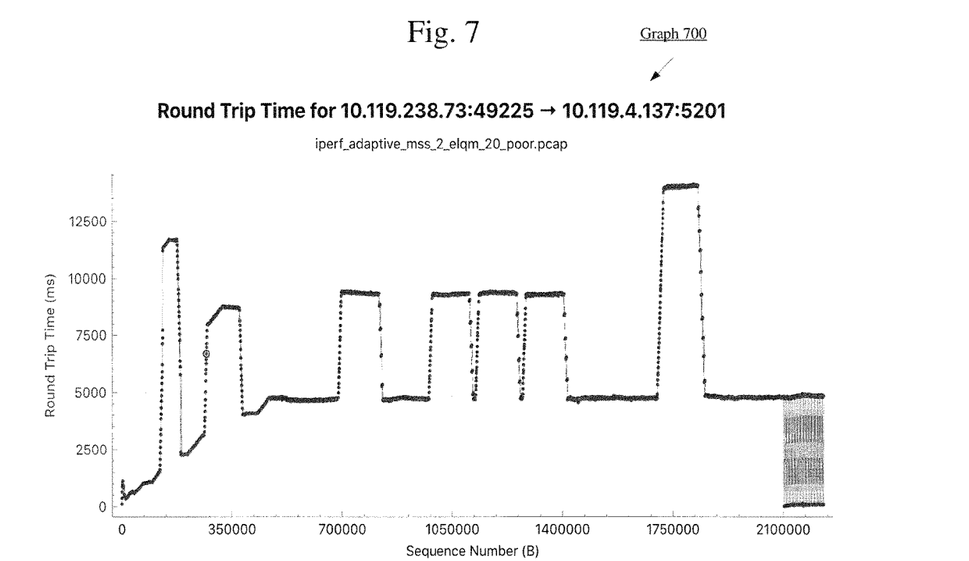
FIG. 7 shows an exemplary graph depicting the TCP RTT for data where the adaptive MSS according to various embodiments described herein is utilized.

FIG. 7 shows an exemplary graph 700 depicting the TOP RTT for data where the adaptive MSS according to various embodiments described herein is utilized. As illustrated in graph 700, the use of the adaptive MSS allows for the TCP RTT to be smoothed out since data may be forced out faster in terms of TCP segments, as detailed above. For instance, the RTT may experience only small peaks of 9000 ms, with an occasional high peak of 11000 ms or 13000 ms throughout data packet sequence numbers 0-2100000. Accordingly, the peaks with the adaptive MSS have considerably smaller maximum values and are dispersed across a much broader sequence of data packets.

It may be noted that the exemplary embodiments are described with reference to the TCP of LTE and LTE-Advanced communication system. However, those skilled in the art will understand that the exemplary embodiments may be applied to selecting and adjusting a maximum size of a data segment, such as the TCP MSS, within any wireless communication schemes including those having different characteristics from the LTE scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising: at a user equipment ("UE"): establishing a transmission control protocol (TCP) connection for communication over a network;
    identifying a first TCP maximum segment size (MSS) value for data transmissions that are to be performed by the UE via the TCP connection, wherein the first TCP MSS value is announced during the establishment of the TCP connection;
    setting a current size setting for TCP MSS to the first TCP MSS value;
    receiving current physical layer conditions;
    determining historical data associated with the UE and TCP MSS uplink; and
    adjusting the current size setting to a second TCP MSS value based on at least one of (i) the current physical layer conditions or (ii) the historical data, wherein the second TCP MSS value is to be applied to a data transmission that is to be performed by the UE via the TCP connection.

2. The method of claim 1, wherein the current physical layer conditions include one of a received signal strength indicator ("RSSI") and a channel quality indicator ("CQI").

3. The method of claim 1, wherein the current size setting includes a plurality of predetermined size settings.

4. The method of claim 1, wherein adjusting the current size setting includes changing the current size setting to one of a first communication condition setting, a second communication condition setting or a third communication condition setting.

5. The method of claim 4, wherein the first communication condition setting is larger than the second communication condition setting, and the second communication condition setting is larger than the third communication condition setting.

6. A user equipment ("UE") device, comprising: a non-transitory memory having a program stored thereon; and a processor, wherein execution of the program causes the processor to perform operations comprising: identifying a first transmission control protocol (TCP) maximum segment size (MSS) value for data transmissions that are to be performed by the UE via a TCP connection,
    wherein the first TCP MSS value is announced during the establishment of the TCP connection;
    setting a current size setting for TCP MSS to the first TCP MSS value;
    receiving current physical layer conditions;
    determining historical data associated with the UE and TCP MSS; and
    adjusting the current size setting to a second TCP MSS value based on at least one of (i) the current physical layer conditions and or (ii) the historical data, wherein the second TCP MSS value is to be applied to a data transmission that is to be performed by the UE via the TCP connection.

7. The UE device of claim 6, wherein the current physical layer conditions include one of a received signal strength indicator ("RSSI") and a channel quality indicator ("CQI").

8. The UE device of claim 6, wherein the current size setting includes a plurality of predetermined size settings.

9. The UE device of claim 6, wherein adjusting the current size setting includes changing the current size setting to one of a first communication condition setting, a second communication condition setting or a third communication condition setting.

10. The UE device of claim 9, wherein the first communication condition setting is larger than the second communication condition setting, and the second communication condition setting is larger than the third communication condition setting.

11. An integrated circuit, comprising:
   circuitry to identify a first transmission control protocol (TCP) maximum segment size (MSS) for data transmissions that are to be performed by a UE via a TCP connection, wherein the first TCP MSS value is announced during the establishment of the TCP connection and wherein a current size setting for TCP MSS is set to the first TCP MSS value,
   wherein the circuitry further receives current physical layer conditions and determines historical data associated with the UE and TCP MSS, and
   wherein the circuitry further adjusts the current size setting to a second TCP MSS value based on at least one of (i) the current physical layer conditions and or (ii) the historical data, wherein the second TCP MSS value is to be applied to a data transmission that is to be performed by the UE via the TCP connection historical uplink grant size measurements.

12. The integrated circuit of claim 11, wherein the current physical layer conditions include one of a received signal strength indicator ("RSSI") and a channel quality indicator ("CQI").

13. The integrated circuit of claim 11, wherein adjusting the current size setting includes changing the current size setting to one of a first communication condition setting, a second communication condition setting or a third communication condition setting.

14. The integrated circuit of claim 13, wherein the first communication condition setting is larger than the second communication condition setting, and the second communication condition setting is larger than the third communication condition setting.

15. The method of claim 1,
   wherein historical data corresponding to the UE and TCP MSS includes historical packet transmission delay measurements of the UE and historical uplink grant size measurements of the UE.

16. The method of claim 1, wherein the current size setting is reduced when the historical data indicates a reduction in an uplink grant size due to transmit power limitations of the UE.

* * * * *

UNITED STATES PATENT AND TRADEMARK OFFICE
CERTIFICATE OF CORRECTION

PATENT NO. : 10,433,213 B2  
APPLICATION NO. : 15/178309  
DATED : October 1, 2019  
INVENTOR(S) : Vangala et al.

Page 1 of 1

It is certified that error appears in the above-identified patent and that said Letters Patent is hereby corrected as shown below:

In the Claims

Claim 6; Column 8; Lines 54:
"layer conditions and or (ii) the historical data, wherein; and" should read "layer conditions or (ii) the historical data, wherein"

Claim 11; Column 9; Lines 20:
"one of (i) the current physical layer conditions and or" should read "one of (i) the current physical layer conditions or"

Signed and Sealed this  
Nineteenth Day of May, 2020

Andrei Iancu  
*Director of the United States Patent and Trademark Office*